UNITED STATES PATENT OFFICE.

PAUL ERWIN OBERREIT, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PROCESS OF MAKING HALOGENATED INDIGO-WHITE.

No. 835,462. Specification of Letters Patent. Patented Nov. 6, 1906.

Application filed April 17, 1906. Serial No. 312,210.

*To all whom it may concern:*

Be it known that I, PAUL ERWIN OBERREIT, doctor of philosophy and chemist, a subject of the King of Saxony, residing at Ludwigshafen-on-the-Rhine, in the Kingdom of Bavaria, German Empire, have invented new and useful Improvements in Process for the Production of Halogenated Indigo-White, of which the following is a specification.

My invention relates to the production of halogenated indigo-white from halogenated indigo. It is well known that bromindigo and chlorindigo and their homologues can be converted into the corresponding indigo-white compounds by means of reducing agents, such as are employed in the reduction of indigo to indigo-white; but these reducing agents when used for reducing halogenated indigo have the disadvantage that they remove the halogen to some extent, causing the production of ordinary indigo-white mixed with halogenated indigo-white. I have discovered that halogenated indigo can be converted into the corresponding halogenated indigo-white by acting upon the said halogenated indigo with indigo-white. It is preferable to make use of indigo-white in caustic-soda solution. When working according to this process, halogenated indigo-white is obtained in solution, while indigo is precipitated and can be removed by filtration.

The following examples will serve to further illustrate the nature of my invention and how it can be carried into practical effect; but my invention is not confined to these examples, and it is to be understood that other halogenated indigo can be treated in a similar way. The parts are by weight.

Example 1: Warm to a temperature of from eighty (80) to one hundred (100) degrees centigrade one hundred (100) parts of twenty (20) per cent. indigo-white solution which also contains five (5) per cent. of caustic soda and while stirring add twenty (20) parts of bromindigo. Continue stirring for from three (3) to four (4) hours, and then filter off the indigo which has been precipitated. The solution of bromindigo-white which is thus obtained can be used directly for dyeing.

Example 2: Stir fifty (50) parts of ortho-tolyl indigo-white with one thousand (1,000) parts of water which is free from dissolved air and add sixty (60) parts of a thirty-five (35) per cent. caustic-soda solution. As soon as the indigo-white is dissolved warm to a temperature of from sixty (60) to seventy (70) degrees centigrade, and while continually stirring add fifty-six (56) parts of chlor-ortho-tolyl indigo. Stir for two (2) hours, and then filter off the ortho-tolyl indigo which has separated out.

Now what I claim is—

1 The process for the production of halogenated indigo-white by reducing halogenated indigo by means of indigo-white.

2. The process for the production of halogenated indigo-white by reducing halogenated indigo by means of indigo-white in caustic-soda solution.

In testimony whereof I have hereunto set my hand in the presence of two subscribing witnesses.

PAUL ERWIN OBERREIT.

Witnesses:
J. ALEC. LLOYD,
Jos. H. LEUTE.